United States Patent [19]

Davidson et al.

[11] Patent Number: 4,613,858
[45] Date of Patent: Sep. 23, 1986

[54] ERROR ISOLATOR FOR BI-DIRECTIONAL COMMUNICATIONS BUSES

[75] Inventors: Dale D. Davidson; David A. Dietz, both of Glendale, Ariz.

[73] Assignee: Sperry Corporation, New York, N.Y.

[21] Appl. No.: 546,682

[22] Filed: Oct. 28, 1983

[51] Int. Cl.[4] ............................................. H04Q 9/00
[52] U.S. Cl. .................................... 340/825.5; 370/85
[58] Field of Search ....................... 340/825.5, 825.51; 370/85, 94, 89, 86

[56] References Cited

U.S. PATENT DOCUMENTS 4,409,592  10/1983  Hunt ................................. 340/825.5
4,463,351  7/1984  Chiarottino ..................... 340/825.5
4,519,074  5/1985  Basile ............................... 340/825.5

Primary Examiner—Donald J. Yusko
Attorney, Agent, or Firm—Howard P. Terry; Seymour Levine

[57] ABSTRACT

A communication bus user design that significantly reduces the likelihood of bus disablement. Request to transmit received by a user are validated in the communications processor and by an interlock circuit. Logic signals generated in response to the two validations are coupled to an AND gate, wherefrom an enabling signal is coupled to an amplifier when the two logic signals coincide. Communications signals from the communications processor are thereafter coupled via the amplifier to the bus.

6 Claims, 3 Drawing Figures

ERROR ISOLATOR FOR BI-DIRECTIONAL COMMUNICATIONS BUSES

BACKGROUND OF THE INVENTION

1. Field of the Invention

The invention pertains generally to multi-user digital bidirectional communications buses which utilize central bus controllers for traffic direction, and more specifically to the protection of multi-user communications networks from residual design errors in bus user elements.

2. Description of the Prior Art

Avionic systems have progressively been converted from analog-to-digital. This development should continue with microprocessor based design permeating virtually all new avionic product, necessitating proper interfaces between digital boxes to take advantage of the ability to serially transmit vast amount of data over single pairs of interconnecting cables. With such systems significant costs and weight savings can be realized and system reliability can be improved.

Further increases in reliability may be achieved with redundant systems. Redundant multi-user bi-directional communications buses, however, are susceptable to simultaneous disablement due to bus user disign errors. An error common to similar elements, distributed and separated between redundant buses can result in multi-bus disablements. Such errors may be eliminated by thorough testing to seek out and correct design errors. This is an expensive procedure, however, and significantly adds to the cost of the overall system. Significant changes may be realized by designing error tolerant communications networks. Such networks for large numbers of users and many user design variations do not generate high levels of confidence, unless adequately tested. This problem is compounded when similar type user elements are distributed on redundant communications networks, for it is difficult to determine the existence of a low likelihood of multiple network disablements due to a single error that may be cross coupled via common design.

The present invention provides a communications network tolerant to design errors in user elements that permits a modest likelihood that disabling design errors are residual within these elements.

SUMMARY OF THE INVENTION

The present invention provides a design error tolerant communication bus system by establishing a fixed interval after the receipt of a request to transmit during which a user element must complete transmission. This is accomplished by coupling logic signals, generated by the validation circuitry in the user communication processor and by an external electronic interlock circuit, after the request to transmit signal from the traffic control element has been received, to a gate that thereafter enables an amplifier through which the communication processor transmits. Since the gate provides an enabling signal only for the time duration of the two logic signals, user design errors that permit the communication processor to continue transmission after its allotted time has a minimum effect on the overall bus communication system by substantially eliminating interference with communications signals coupled to the bus by subsequent user elements. An additional feature of the invention compares the validation signal from the communications processors with the enabling signal from the gate. Should a substantial error exist, the communication generator is disabled and transmission ceases.

DESCRIPTION OF THE PREFERRED EMBODIMENTS

Figure 1:
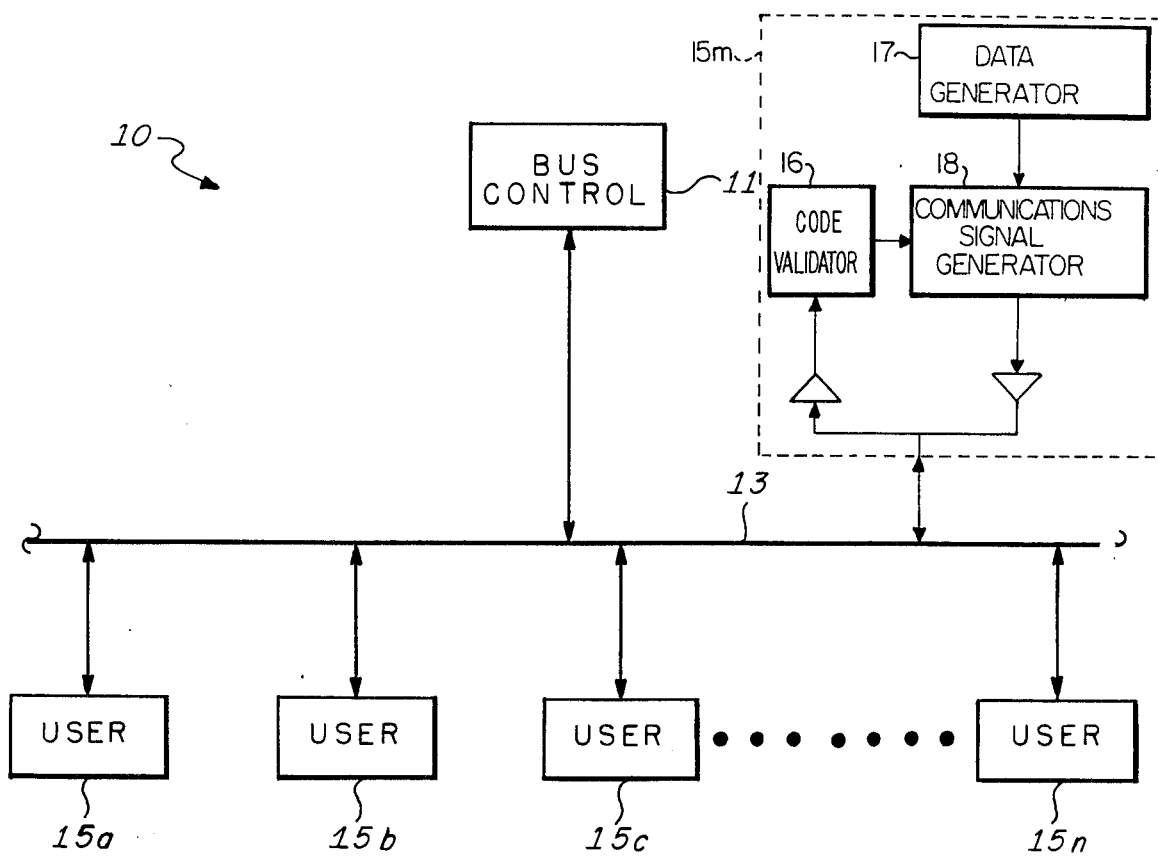
FIG. 1 is a block diagram illustrating the bus control unit and user couplings to a communications bus.

Referring now to FIG. 1 there is illustrated a communications network 10 having a bus controller 11 which controls traffic along communications bus by generating a sequence of coded signals that propagate along the bus 13 to sequentially activate user 15a through 15n. Each user contains therein data that may be transmitted within an allotted time interval. This data is coupled to the communications bus 13 upon receipt at the user of its request to transmit code. For example a request to transmit addressed to user 15m is amplified and validated by code validator 16. A transmit signal is then coupled from code validator 16 to communication signal generator 18 which has received data for transmission from a data generator 17. Thereafter a data modulated signal is generated within the allotted time, amplified and coupled to the bus 13 for distribution. At the conclusion of the allotted time interval the code next in the series is transmitted and received by the user assigned that code whereafter that user couples the data stored therein to the communications bus 13. Sequential coupling to the communications bus 13 from the users 15 continues until all N users have coupled the data stored therein to the communications bus, whereafter the series of codes is recycled. In some systems of the prior art each user transmits a data transmission completion signal to the bus control 11 that triggers the subsequent request to transmit code.

The communications bus 13 is a user-to-user communication media which allows all users to transmit data one at a time. If two or more users are transmitting simultaneously data errors are generated and the system breaks down. This may occur, in systems wherein the bus control element sequentially generates the request to transmit codes, if design errors exist that permit a user to transmit its data over a time interval that exceeds the allotted time slot. In systems wherein the bus control 11 transmits the next request to transmit code upon the reception of a data completion signal the entire system is shut down if such a signal is not transmitted by the user at the completion of its data signal.

Figure 2:
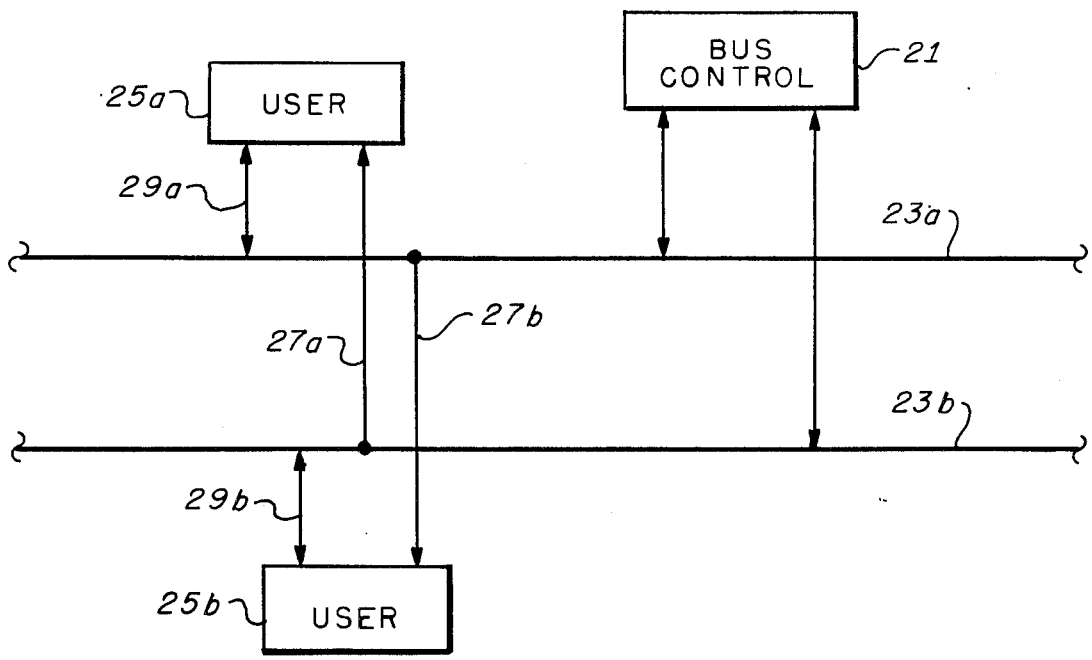
FIG. 2 is a block diagram illustrating the bus control unit and user couplings to redundant communications bus lines.

Greater reliability may be obtained for a communications bus system by providing redundant buses as shown in FIG. 2. A bus controller 21 is coupled to redundant buses 23a, 23b to provide communications traffic control by sequentially generating request to transmit codes to users of the bus, such as users 25a, 25b the only users shown in FIG. 2. Each user is coupled to the opposite side bus to receive data only, as for example, user 25a coupled to bus 23b via line 27a and user 25b coupled to bus 23a via line 27b, and to its own side bus to receive data, including requests to transmit, and to transmit communications signals, as for example user 25a to bus 23a via line 29a and user 25b to bus 23b via line 29b. In this manner data from buses 23a, 23b are available to users 25a, 25b, thus minimizing the probability of the disablement of both busses 23a, 23b due to hardware faults in users of the buses such as users 25a, 25b. If the user elements are of identical design, however, residual design errors, i.e. errors not detected during the design and test phase, will be identical in all user elements creating a high probability of total bus disablement at the occurrence of the malfunction caused by the design error.

Figure 3:
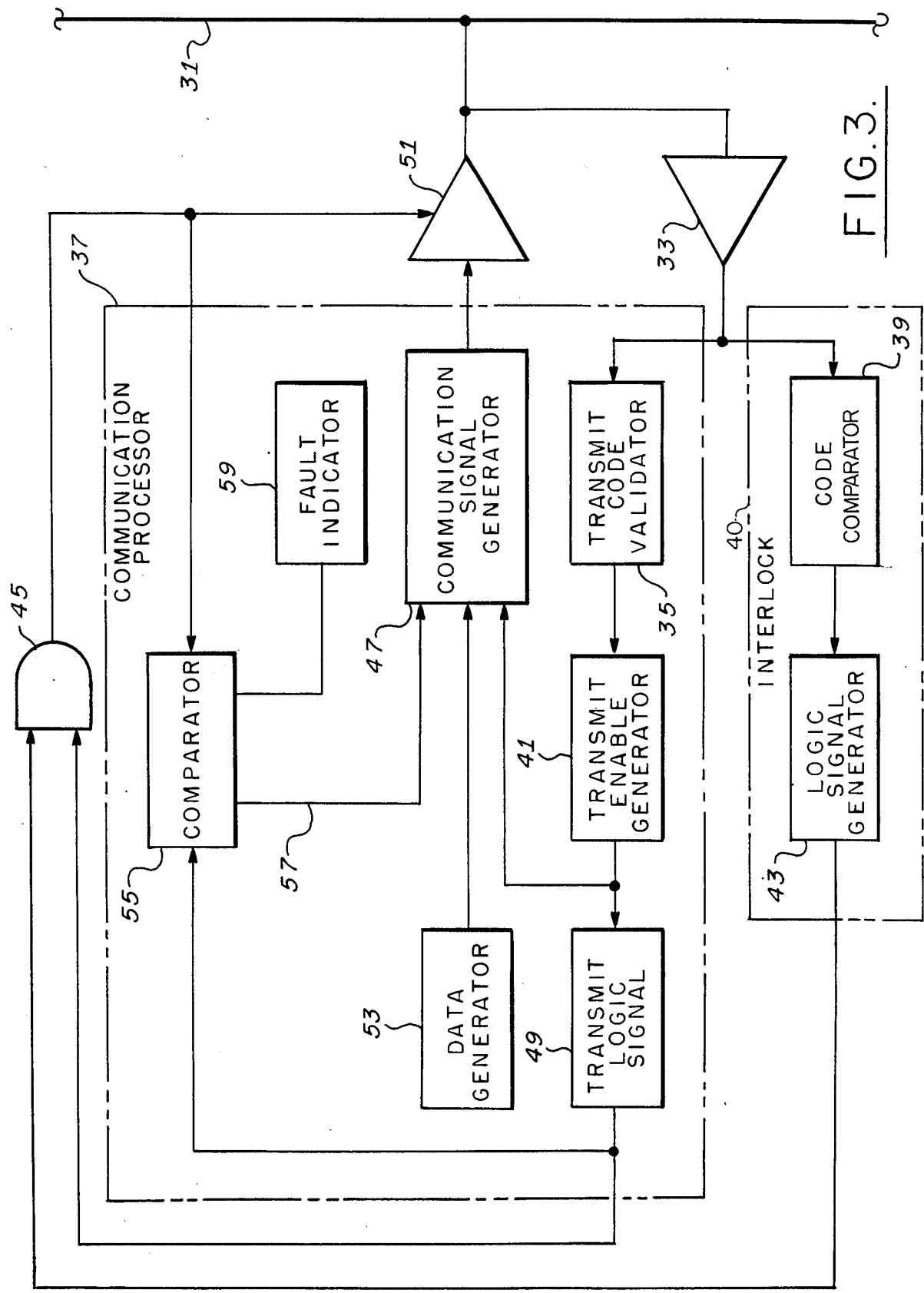
FIG. 3 is a block diagram of an embodiment of the invention that may be employed as a user of the communications buses of FIGS. 1 and 2.

The preferred embodiment of the invention, the block diagram of which is shown in FIG. 3, substantially eliminates the possibility of disabling the communications bus due to a user design error. In the preferred embodiment, a request to transmit is coupled to the user from the bus control unit, not shown, via bus 31. Amplifier 33, in the user, couples the request to transmit code to a transmit code validator 35 in communication processor 37 and to a transmit code comparator 39 in an interlock 40 external to the communication processor. When the received request to transmit code matches the codes stored in transmit code validator 35 and transmit code comparator 39 signals are coupled to transmit enable generator 41 and logic signal generator 43 respectively. In response to the signal coupled from code comparator 39 logic signal generator 43 couples a logic signal of predetermined duration to one input terminal of AND gate 45. In response to the signal coupled from transmit code validator 35 transmit enable generator 41 couples an enabling signal to communication signal generator 47. This enabling signal is also coupled to transmit logic signal generator 49 which in response thereto, couples a second logic signal of predetermined duration to the second input terminal of AND gate 45. The output terminal of AND gate 45 is coupled to the enabling terminals of amplifier 51 which is activated upon the receipt of the two logic signals at the input terminals of AND gate 45. After an appropriate time delay from the time the transmit enable signal is coupled to the communication signal generator, signals, representative of data coupled from data generator 53, stored in the communication signal generator 47 are coupled to the now activated amplifier 51 and therefrom to the communications bus 31. Signal clocking not shown, may be performed, as those skilled in the art will recognize, with any one of a number of methods. As for example, the clocking method known in the art as Manchester Encoding, wherein clock signals are transmitted with the data, may be utilized in the one wire pair represented in FIG. 3.

Proper operation of AND gate 45 may be determined by coupling the output terminal thereof to an input terminal of a caparator 55 a second input terminal of which may be coupled to the output terminal of transmit logic signal generator 49. If the logic levels at the output terminals of AND gate 45 and transmit logic signal generator 49 are inconsistant comparator 55 couples a signal via lead 57 to deactivate communication signal generator 47 and additionally activates a fault indicator 59.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a communication system of the type having a bus for bi-directional signal propagation, a bus control coupled to the bus for providing signal traffic direction by transmitting a sequence of request to transmit codes, and bus users coupled to the bus, each bus user having a communication signal generator and an assigned request to transmit code which, when received, activates that user to transmit, the improvement in the user comprising:

interlock means responsive to a preselected request to transmit code for generating first logic signals with predetermined time duration;
   enabling means responsive to said preselected request to transmit code for providing enabling signals to said communication signal generator;
   transmit logic signal means responsive to said enabling signals for generating second logic signals of predetermined time duration; and
   gate means coupled to receive said first and second logic signals and to said communication signal generator for coupling said communication signal generator to said bus when said first and second logic signals are simultaneously coupled to said gate means.

2. A communication system in accordance with claim 1 wherein said interlock means includes:

a code comparator coupled to said bus for providing a reception signal in response to said preselected request to transmit code coupled thereto from said bus; and
   a logic signal generator coupled to said code comparator and said gate means for providing said first logic signals to said gate means in response to said reception signal.

3. A communication system in accordance with claim 1 wherein said gate means includes:

an AND gate having an output terminal and first and second input terminals coupled respectively to receive said first and second logic signals; and
   an amplifier having an enabling terminal coupled to said output terminal of said AND gate, an input terminal coupled to said communications signal generator means and an output terminal coupled to said bus means.

4. A communication system in accordance with claim 3 further including means coupled to said output terminal of said AND gate and to said transmit logic signal means for comparing signals at said output terminal of said AND gate to said logic signals to provide a disabling signal to said generator means whenever a predetermined improper comparison is indicated.

5. A communication system in accordance with claim 4 wherein said interlock means includes:

a code comparator coupled to said bus for providing a reception signal in response to said preselected request to transmit code coupled thereto from said bus; and
   a logic signal generator coupled to said code comparator and said gate means for providing said first logic signals to said gate means in response to said reception signal.

6. A communication system in accordance with claim 1 wherein said enabling means includes:

code validator coupled to said bus for providing a reception signal in response to said preselected request to transmit code coupled thereto from said bus; and
   an enable generator coupled to said code validator, said communication signal generator, and said logic signal generator for providing said enabling signal to said communication signal generator and said transmit logic signal means in response to said reception signal.

* * * * *